United States Patent
Huang

(10) Patent No.: US 9,390,469 B2
(45) Date of Patent: Jul. 12, 2016

(54) SYSTEM AND PROCESS FOR IMAGE RESCALING USING ADAPTIVE INTERPOLATION KERNAL WITH SHARPNESS AND DE-RINGING CONTROL

(71) Applicant: STMICROELECTRONICS ASIA PACIFIC PTE. LTD., Singapore (SG)

(72) Inventor: Yong Huang, Singapore (SG)

(73) Assignee: STMICROELECTRONICS ASIA PACIFIC PTE. LTD., Singapore (SG)

( * ) Notice: Subject to any disclaimer, the term of this patent is extended or adjusted under 35 U.S.C. 154(b) by 50 days.

(21) Appl. No.: 14/466,274

(22) Filed: Aug. 22, 2014

(65) Prior Publication Data

US 2014/0362288 A1    Dec. 11, 2014

Related U.S. Application Data

(63) Continuation of application No. 12/802,382, filed on Jun. 4, 2010, now abandoned.

(51) Int. Cl.
*G06K 9/32* (2006.01)
*G06T 3/40* (2006.01)

(52) U.S. Cl.
CPC ................................. *G06T 3/4007* (2013.01)

(58) Field of Classification Search
None
See application file for complete search history.

(56) References Cited

U.S. PATENT DOCUMENTS

| | | |
|---|---|---|
| 4,866,647 A | 9/1989 | Farrow |
| 5,008,752 A | 4/1991 | Van Nostrand |
| 5,054,100 A | 10/1991 | Tai |
| 5,268,758 A | 12/1993 | Nakayama et al. |
| 5,294,998 A | 3/1994 | Piovoso et al. |
| 5,327,257 A | 7/1994 | Hrytzak et al. |
| 5,418,714 A | 5/1995 | Sarver |
| 5,422,827 A | 6/1995 | Niehaus |
| 5,768,482 A | 6/1998 | Winter et al. |

(Continued)

FOREIGN PATENT DOCUMENTS

| | | | |
|---|---|---|---|
| EP | 1533899 A1 * | 5/2005 | ............ G06T 3/4007 |
| JP | 04157988 | 5/1992 | |
| JP | 05056306 A * | 3/1993 | |

OTHER PUBLICATIONS

Li et al./ "An arbitrary ratio resizer for MPET applications", IEEE Transactions on Consumer Electronics, vol. 46, issue 3, 2000, pp. 467-473.

*Primary Examiner* — Wenpeng Chen
(74) *Attorney, Agent, or Firm* — Allen, Dyer, Doppelt, Milbrath & Gilchrist, P.A.

(57) ABSTRACT

A digital video rescaling system is provided. The system includes an image data input configured to receive input support pixels $y_1$ to $y_n$ and a sharpness control module configured to generate a sharpness control parameter Kshp. The system further includes an interpolated pixel generator configured to use an adaptive interpolation kernel to generate an interpolated pixel $y_s$ based on the input support pixels, and adjust a sharpness of the interpolated pixel $y_s$ based at least partly upon the sharpness control parameter Kshp. The system also includes a de-ringing control unit to adjust the ringing effect of the interpolated pixel based on a local image feature Kfreq, and an output module configured to output the adjusted interpolated pixel for display.

19 Claims, 6 Drawing Sheets

(56) References Cited

U.S. PATENT DOCUMENTS

| | | |
|---|---|---|
| 5,774,601 A | 6/1998 | Mahmoodi |
| 5,838,371 A | 11/1998 | Hirose et al. |
| 5,949,924 A | 9/1999 | Noguchi et al. |
| 6,195,394 B1 | 2/2001 | Arbeiter et al. |
| 6,198,545 B1 | 3/2001 | Ostromoukhov et al. |
| 6,233,277 B1 | 5/2001 | Ozcelik et al. |
| 6,373,535 B1 | 4/2002 | Shim et al. |
| 6,810,155 B1 | 10/2004 | Ting et al. |
| 6,847,738 B1* | 1/2005 | Scognamiglio ........ H04N 5/208 348/E5.076 |
| 6,928,196 B1 | 8/2005 | Bradley et al. |
| 7,151,863 B1 | 12/2006 | Bradley et al. |
| 7,197,194 B1 | 3/2007 | Ratcliffe |
| 7,224,371 B2 | 5/2007 | Serizawa |
| 7,321,400 B1 | 1/2008 | Chou et al. |
| 7,379,626 B2 | 5/2008 | Lachine et al. |
| 7,391,933 B2 | 6/2008 | Wang et al. |
| 7,437,018 B1 | 10/2008 | Amirghodsi |
| 7,782,401 B1 | 8/2010 | Chou |
| 8,248,493 B2 | 8/2012 | Higashi |
| 8,249,395 B2 | 8/2012 | Peng et al. |
| 2002/0012464 A1 | 1/2002 | Han et al. |
| 2002/0030762 A1 | 3/2002 | Kishimoto |
| 2003/0001867 A1 | 1/2003 | Matsumoto |
| 2003/0231714 A1 | 12/2003 | Kjeldsen et al. |
| 2004/0091174 A1 | 5/2004 | Wang et al. |
| 2004/0207758 A1 | 10/2004 | Sai et al. |
| 2004/0234165 A1 | 11/2004 | Lee |
| 2005/0226538 A1 | 10/2005 | Di Federico et al. |
| 2006/0018562 A1 | 1/2006 | Ruggiero |
| 2006/0022984 A1 | 2/2006 | Ruggiero |
| 2006/0033936 A1 | 2/2006 | Lee et al. |
| 2006/0061690 A1 | 3/2006 | De Haan et al. |
| 2006/0110062 A1* | 5/2006 | Chiang ................ H04N 19/117 382/260 |
| 2006/0133693 A1 | 6/2006 | Hunt |
| 2006/0139376 A1* | 6/2006 | Le Dinh ................ G06T 3/4084 345/660 |
| 2006/0146935 A1 | 7/2006 | Winger |
| 2006/0153473 A1 | 7/2006 | Ruggiero |
| 2006/0269166 A1* | 11/2006 | Zhong ................... G06T 3/4007 382/300 |
| 2007/0081743 A1 | 4/2007 | Kim |
| 2008/0151101 A1* | 6/2008 | Tian ...................... H04N 5/145 348/448 |
| 2009/0027559 A1 | 1/2009 | Higashi |
| 2009/0262247 A1 | 10/2009 | Huang et al. |
| 2010/0165204 A1 | 7/2010 | Huang et al. |
| 2010/0272376 A1 | 10/2010 | Hsu |
| 2010/0283799 A1* | 11/2010 | Li .......................... G09G 5/005 345/660 |
| 2011/0216985 A1* | 9/2011 | Peng ........................ G06T 3/40 382/260 |

* cited by examiner

SYSTEM AND PROCESS FOR IMAGE RESCALING USING ADAPTIVE INTERPOLATION KERNAL WITH SHARPNESS AND DE-RINGING CONTROL

TECHNICAL FIELD OF THE INVENTION

The present invention generally relates to the field of digital image processing, and more particularly to a system and process for rescaling digital images for display.

BACKGROUND OF THE INVENTION

Digital images have become more popular in the field of image display because they offer clarity and less distortion during processing. Furthermore, a wider range of image processing algorithms can be applied to digital images. Interpolation is a common stage in image processing to improve the appearance of the processed image on the output imaging medium. Interpolation is often performed during rescaling or resizing of digital images.

Rescaling or resizing of digital images includes magnification or reduction of image. For example, large screen displays have a native resolution that reaches or exceeds the well-known high-definition TV (HDTV) standard. In order to display a low-resolution digital image on a large screen display, it is desirable to rescale the image to a full screen resolution.

Traditionally, linear interpolation techniques such as bilinear or bicubic interpolation are used to rescale digital images. The bilinear interpolation method interpolates an input signal using a 2-tap filter. In this method, only the two pixels immediately on either side of the location of the new pixel are used. The bicubic interpolation method interpolates an input signal using a 4-tap filter. In this method, two pixels on either side of the location of the new pixel are used.

2-tap and 4-tap filters all have degradation in the high frequency region. These filters often suffer from image quality issues, such as blurring, aliasing, and staircase edges. 8-tap interpolation, such as that performed by an 8-tap polyphase filter, improves reconstruction in the high frequency region and reduces the staircase and aliasing issues. However, 8-tap interpolation introduces ringing artifacts along the edges, and the conventional 8-tap interpolation is not flexible in sharpness control.

SUMMARY OF THE INVENTION

A digital video rescaling system is provided. The system includes an image data input configured to receive input support pixels $y_1$ to $y_n$ and a sharpness control module configured to generate a sharpness control parameter Kshp. The system further includes an interpolated pixel generator configured to use an adaptive interpolation kernel to generate an interpolated pixel $y_s$ based on the input support pixels, and adjust a sharpness of the interpolated pixel $y_s$ based at least partly upon the sharpness control parameter Kshp. The system also includes an output module configured to output the adjusted interpolated pixel $y_s$ for display.

A method of rescaling digital video is provided. The method includes receiving input support pixels $y_1$ to $y_n$ at an image data input, generating a sharpness control parameter Kshp at a sharpness control module, and generating an interpolated pixel $y_s$ based on the input support pixels $y_1$ to $y_n$ at an interpolated pixel generator. The method further includes adjusting a sharpness of the interpolated pixel $y_s$ based at least partly upon the sharpness control parameter Kshp at the interpolated pixel generator, and outputting the adjusted interpolated pixel $y_s$ for display.

A digital video rescaling system is provided. The system includes an image data input configured to receive input support pixels $y_1$ to $y_n$, and an interpolated pixel generator configured to use an adaptive interpolation kernel to generate an interpolated pixel value $y_s$ based on the input support pixels $y_1$ to $y_n$. The system also includes a de-ringing control unit configured to modify the interpolated pixel value $y_s$ adaptively to a local image feature Kfreq to generate an output $y_{out}$, and an output module configured to output the output $y_{out}$ for display.

A method of rescaling digital video is provided. The method includes receiving support pixels $y_1$ to $y_n$ at an image data input, and using an adaptive interpolation kernel to generate an interpolated pixel $y_s$ based on the input support pixels $y_1$ to $y_n$ at an interpolated pixel generator. The method also includes modifying the interpolated pixel $y_s$ adaptively to a local image feature Kfreq to generate an output $y_{out}$ at a de-ringing control unit, and outputting the output $y_{out}$ for display.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

The present disclosure provides an effective system and method of video image rescaling. The present disclosure describes the use of adaptive interpolation kernels with sharpness and de-ringing control to reduce ringing artifacts while maintaining the quality of the reconstruction in the high frequency region. The sharpness and ringing effect of the interpolated image are controlled using a sharpness control parameter and a de-ringing control parameter.

In some embodiments, a controllable interpolation kernel is used to generate the interpolated outputs, which solves the issues of aliasing and staircase edges. With the adaptive sharpness and de-ringing control, the present disclosure provides a system and method to improve the sharpness of the output image without introducing ringing artifacts that are a common issue in conventional 8-tap interpolation methods.

In particular embodiments, a controllable interpolation kernel with the following key components is provided:

(1): an 8-tap interpolation filter to maintain the quality of the reconstruction in the high frequency region and solve aliasing and staircase problems in the interpolated images;

(2) sharpness control functionality to generate the interpolated images with the visual qualities ranging from relative sharpness to softness; and (3) de-ringing control functionality to adjust the levels of ringing effects along the edges in the interpolated images.

The system and method of the present disclosure can be applied to a generic video image processing system and can be used to both upscale and downscale images with controllable sharpness levels.

Figure 1:
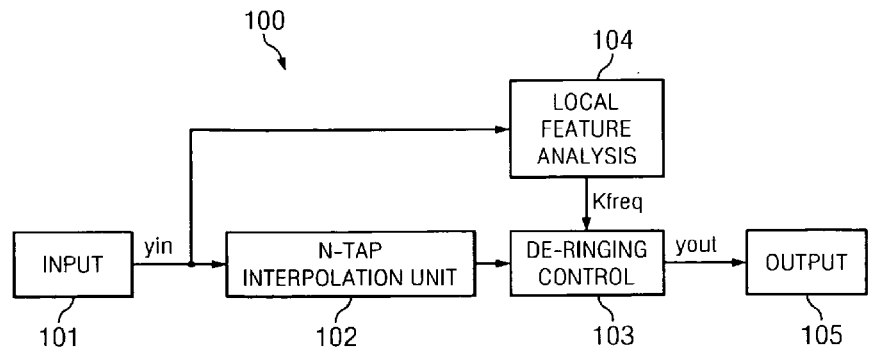
FIG. 1 illustrates a digital video rescaling system according to an embodiment of this disclosure.

FIG. 1 illustrates a digital video rescaling system 100 according to an embodiment of this disclosure.

As shown in FIG. 1, the rescaling system 100 includes an image data input 101, an adaptive 8-tap interpolation unit 102, a de-ringing control unit 103, and a local feature analysis unit 104. The final output of the system 100 is sent from an image data output module 105. The image data input 101 receives a plurality of discrete sample values and sends the sample values to the adaptive 8-tap interpolation unit 102 and the local feature analysis 104. The adaptive 8-tap interpolation unit 102 uses the discrete sample values received from the image data input 101 to generate an interpolated pixel with controllable sharpness value. The de-ringing control unit 103 receives the interpolated pixel from the adaptive 8-tap interpolation unit 102 and modifies the interpolated pixel according to the local feature that was estimated by the local feature analysis unit 104. The local feature analysis unit 104 uses the discrete sample values received from the image data input 101 to estimate local features used by the de-ringing control unit 103.

Figure 2:
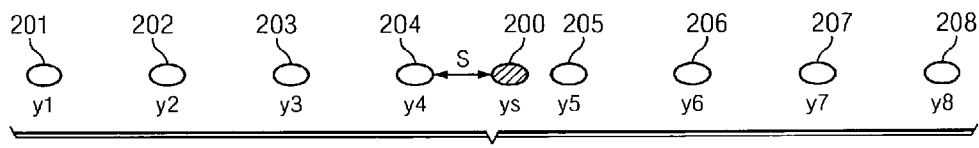
FIG. 2 illustrates the generation of an interpolated pixel based on eight input support pixels according to an embodiment of the present disclosure.

FIG. 2 illustrates the generation of an interpolated pixel 200 based on eight input support pixels 201-208 according to an embodiment of the present disclosure.

As shown in FIG. 2 in particular embodiments, the adaptive 8-tap interpolation unit 102 uses controllable third order polynomial functions based on the eight input support pixels 201-208 to generate the interpolated pixel 200.

In one embodiment, the interpolated pixel 200 can be calculated, for example, by Equation 1 below:

$$y_s = \sum_{n=1}^{8} y_n * f_n(s). \quad [\text{Eqn. 1}]$$

The eight control synthesis functions $f_n(s)$ that can be expressed, for example, by Equations 2-9 below:

$$f_1(s) = C(0,0)*s^3 + C(0,1)*s^2 + C(0,2)*s + C(0,3), \quad [\text{Eqn. 2}],$$

$$f_2(s) = C(1,0)*s^3 + C(1,1)*s^2 + C(1,2)*s + C(1,3), \quad [\text{Eqn. 3}]$$

$$f_3(s) = C(2,0)*s^3 + C(2,1)*s^2 + C(2,2)*s + C(2,3), \quad [\text{Eqn. 4}]$$

$$f_4(s) = C(3,0)*s^3 + C(3,1)*s^2 + C(3,2)*s + C(3,3), \quad [\text{Eqn. 5}]$$

$$f_5(s) = f_4(1-s), \quad [\text{Eqn. 6}]$$

$$f_6(s) = f_3(1-s), \quad [\text{Eqn. 7}]$$

$$f_7(S) = f_2(1-s), \text{ and} \quad [\text{Eqn. 8}]$$

$$f_8(s) = f_1(1-s). \quad [\text{Eqn. 9}]$$

The C(i,j) coefficient metrics of the above control synthesis functions can be calculated, for example, by Equation 10 below:

$$C(i,j) = A(i,j) + K\text{shp}*B(i,j), \quad [\text{Eqn. 10}]$$

In Equation 10, $$A = \begin{bmatrix} a(0,0) & a(0,1) & a(0,2) & a(0,3) \\ a(1,0) & a(1,1) & a(1,2) & a(1,3) \\ a(2,0) & a(2,1) & a(2,2) & a(2,3) \\ a(3,0) & a(3,1) & a(3,2) & a(3,3) \end{bmatrix}$$

and $$B = \begin{bmatrix} b(0,0) & b(0,1) & b(0,2) & b(0,3) \\ b(1,0) & b(1,1) & b(1,2) & b(1,3) \\ b(2,0) & b(2,1) & b(2,2) & b(2,3) \\ b(3,0) & b(3,1) & b(3,2) & b(3,3) \end{bmatrix}$$

are two coefficient matrices, for example, used to generate interpolation kernel and sharpness control kernel.

The coefficient matrices A and B are defined, for example, as shown in Equations 11 and 12 below:

$$A = \begin{bmatrix} -21 & 52 & -32 & 0 \\ 52 & -150 & 97 & 1 \\ -154 & 412 & -256 & 0 \\ 304 & -587 & 28 & 254 \end{bmatrix}, \quad \text{[Eqn. 11]}$$

and $$B = \begin{bmatrix} -9 & 21 & -11 & -2 \\ 15 & -38 & 18 & 3 \\ -32 & 69 & -23 & -11 \\ 51 & -88 & 5 & 21 \end{bmatrix}. \quad \text{[Eqn. 12]}$$

Of course one of ordinary skill in the art would recognize that matrices A and B are just one example of coefficient matrices that may be used to generate an 8-tap interpolation kernel and an 8-tap sharpness control kernel, respectively, and that any number of coefficient matrices may be used without departing from the scope or spirit of the present disclosure.

Accordingly, the interpolated pixel 200 also can be calculated, for example, by Equation 13 below:

$$y_s(s) = \sum_{n=1}^{8} y_n * f_n(s, Kshp), \quad \text{[Eqn. 13]}$$

where $y_n$, n=(1 . . . 8) are the eight support pixels 201-208 from the image data input 101. s is the phase of the interpolation which is the distance from interpolation position to the position of the support pixel $y_4$. The range of phase is from 0 to 1. The number of phases can be defined by the precision of the interpolation. $f_n(s, Kshp)$ (n=1 . . . 8) are eight control synthesis functions that can be expressed, for example, by Equations 14-21 below:

$$f_1(s, Kshp) = \quad \text{[Eqn. 14]}$$
$$(a(0, 0) + Kshp*b(0, 0))*s^3 + (a(0, 1) + Kshp*b(0, 1))*s^2 +$$
$$(a(0, 2) + Kshp*b(0, 2))*s + (a(0, 3) + Kshp*b(0, 3)),$$

$$f_2(s, Kshp) = \quad \text{[Eqn. 15]}$$
$$(a(1, 0) + Kshp*b(1, 0))*s^3 + (a(1, 1) + Kshp*b(1, 1))*s^2 +$$
$$(a(1, 2) + Kshp*b(1, 2))*s + (a(0, 3) + Kshp*b(1, 3)),$$

$$f_3(s, Kshp) = \quad \text{[Eqn. 16]}$$
$$(a(2, 0) + Kshp*b(2, 0))*s^3 + (a(2, 1) + Kshp*b(2, 1))*s^2 +$$
$$(a(2, 2) + Kshp*b(2, 2))*s + (a(2, 3) + Kshp*b(2, 3)),$$

$$f_4(s, Kshp) = \quad \text{[Eqn. 17]}$$
$$(a(3, 0) + Kshp*b(3, 0))*s^3 + (a(3, 1) + Kshp*b(3, 1))*s^2 +$$
$$(a(3, 2) + Kshp*b(3, 2))*s + (a(3, 3) + Kshp*b(3, 3)),$$

$$f_5(s, Kshp) = f_4((1-s), Kshp), \quad \text{[Eqn. 18]}$$

$$f_6(s, Kshp) = f_3((1-s), Kshp), \quad \text{[Eqn. 19]}$$

$$f_7(s, Kshp) = f_2((1-s), Kshp), \quad \text{[Eqn. 20]}$$

and $$f_8(s, Kshp) = f_1((1-s), Kshp). \quad \text{[Eqn. 21]}$$

Figure 3:
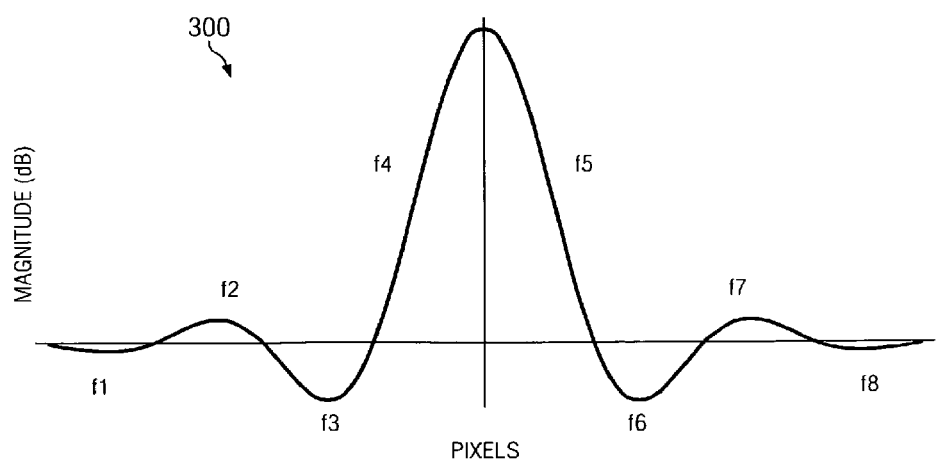
FIG. 3 illustrates an interpolation kernel generated according to an embodiment of the present disclosure.

FIG. 3 illustrates an interpolation kernel 300 generated according to an embodiment of the present disclosure.

In this particular embodiment, the interpolation kernel 300 was generated by the coefficient matrix A.

Figure 4:
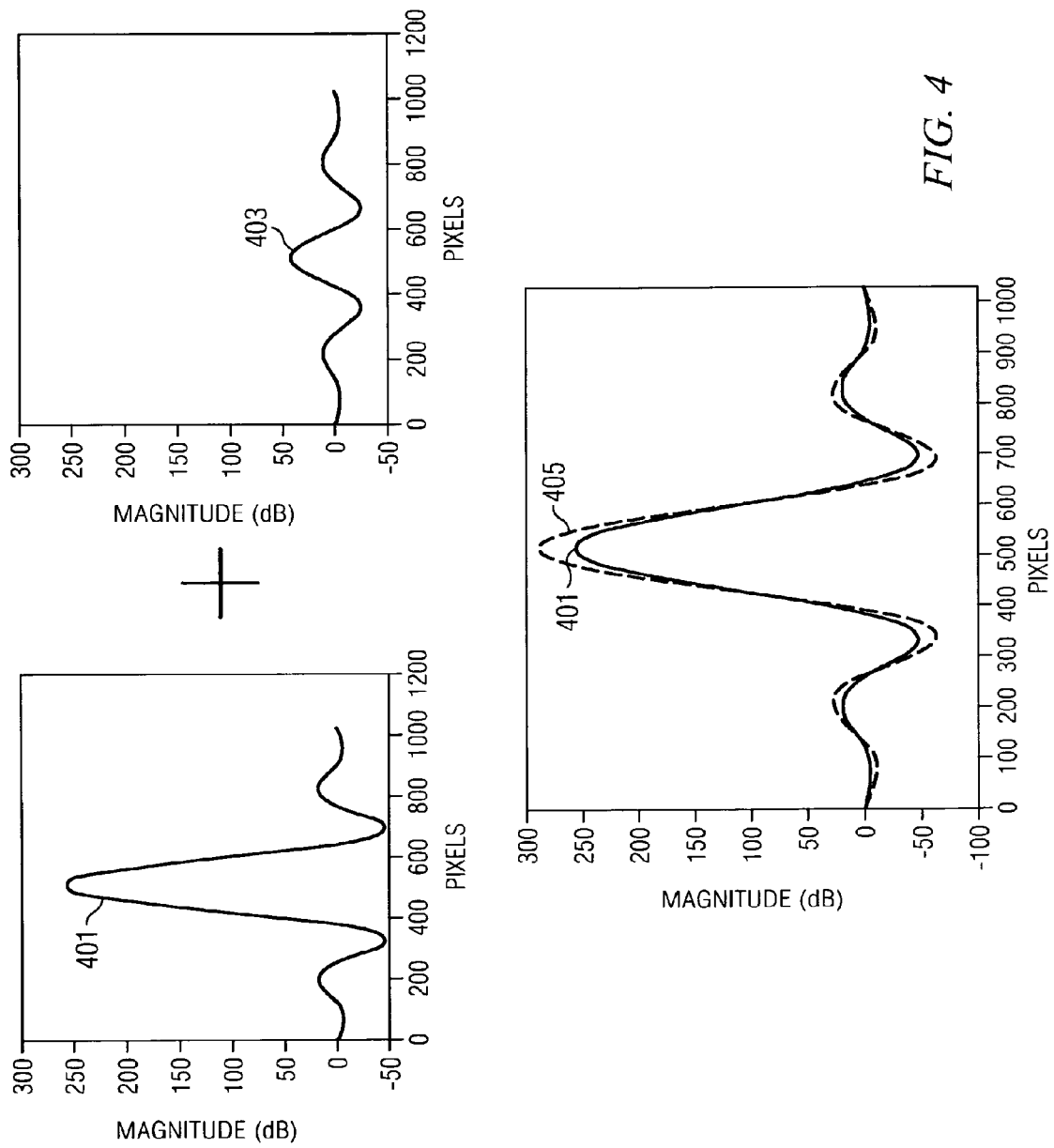
FIG. 4 illustrates an interpolation kernel driven by a sharpness control kernel according to an embodiment of the present disclosure.

FIG. 4 illustrates an interpolation kernel 401 driven by a sharpness control kernel 403 according to an embodiment of the present disclosure.

As shown in FIG. 4, an interpolation kernel 401 is driven by a sharpness control kernel 403. The interpolation kernel 401 may be generated, for example, by coefficient matrix A, and the sharpness control kernel 403 may be generated, for example, by coefficient matrix B. The sharpness control kernel 403 is combined with the interpolation kernel 401 to generate a resulting interpolation kernel 405 having sharpness control. In a particular embodiment, Kshp in Equation 13 is the sharpness control parameter used to adjust the sharpness of the interpolated pixel.

Figure 5:
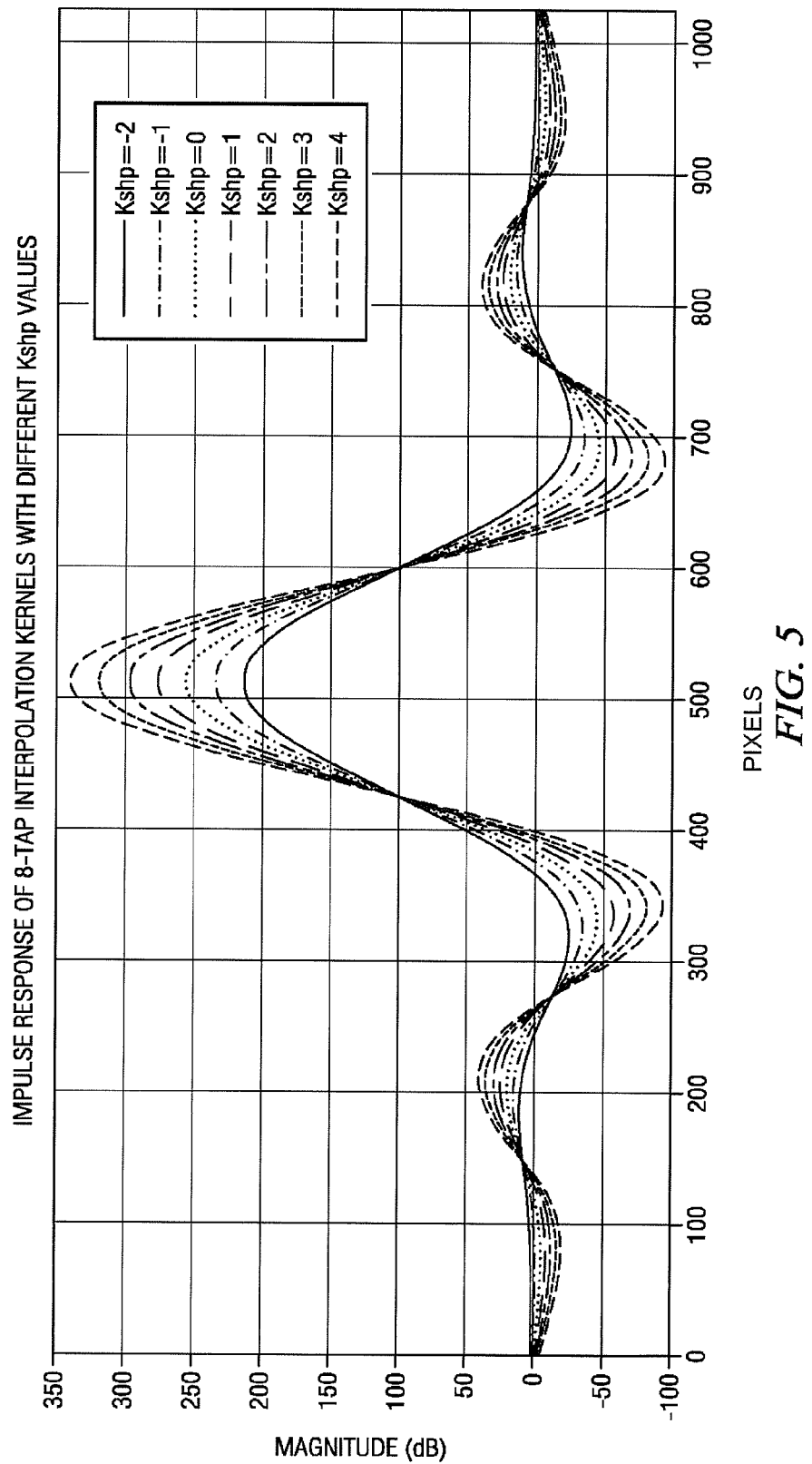
FIG. 5 illustrates interpolation kernels having varying sharpness control values according to an embodiment of the present disclosure.

FIG. 5 illustrates adaptive interpolation kernels having varying sharpness control values according to an embodiment of the present disclosure.

Figure 6:
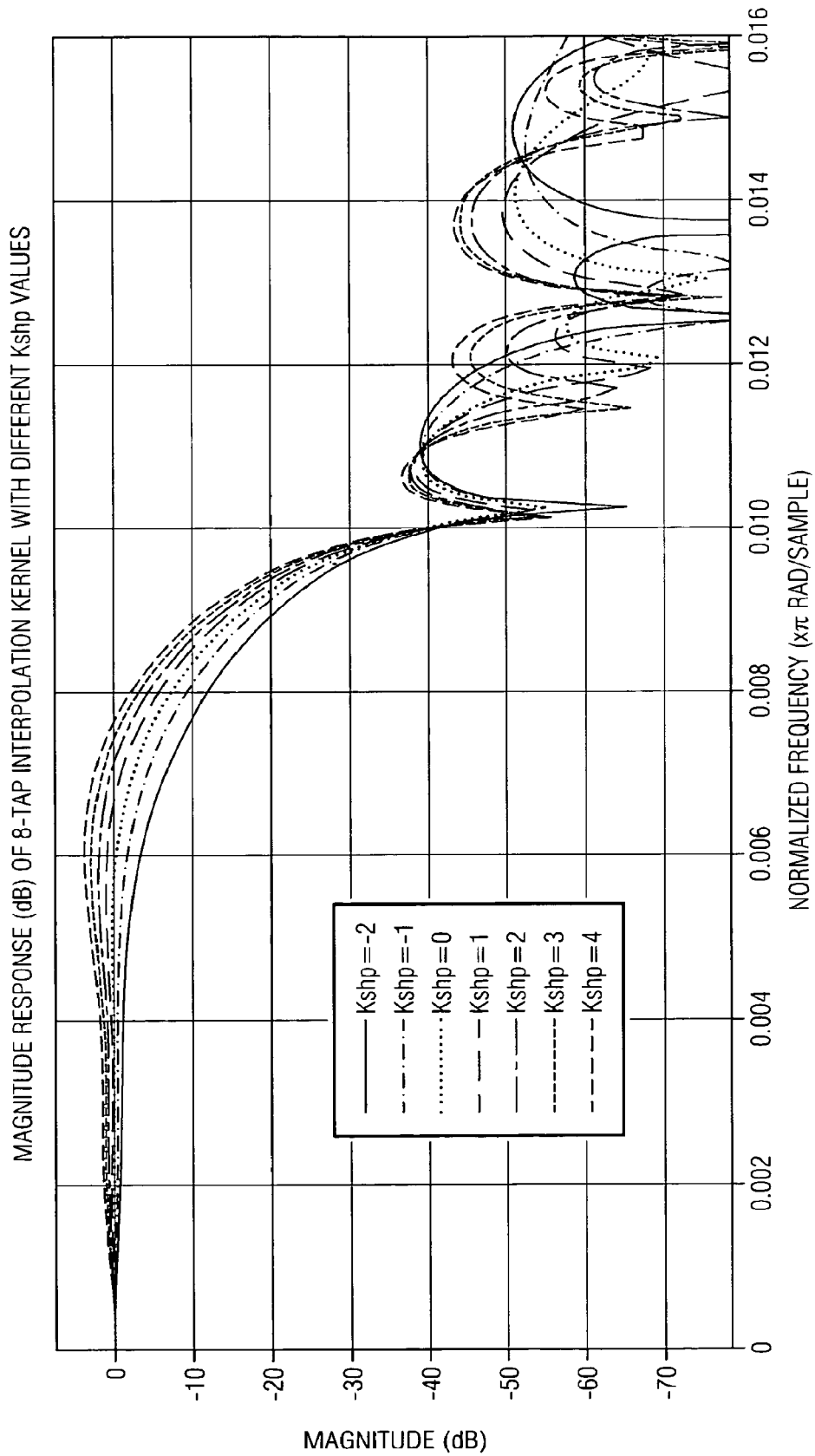
FIG. 6 illustrates the frequency responses of interpolation kernels having varying sharpness control values according to an embodiment of the present disclosure.

FIG. 6 illustrates the frequency responses of adaptive interpolation kernels having varying sharpness control values according to an embodiment of the present disclosure.

As shown in FIGS. 5 and 6, the adaptive interpolation kernels are driven by varying sharpness control values, and their frequency responses vary with the sharpness control values. From the frequency responses, it can be seen that the magnitudes of the high frequency region are adjusted accordingly to the sharpness control parameter.

Figure 7:
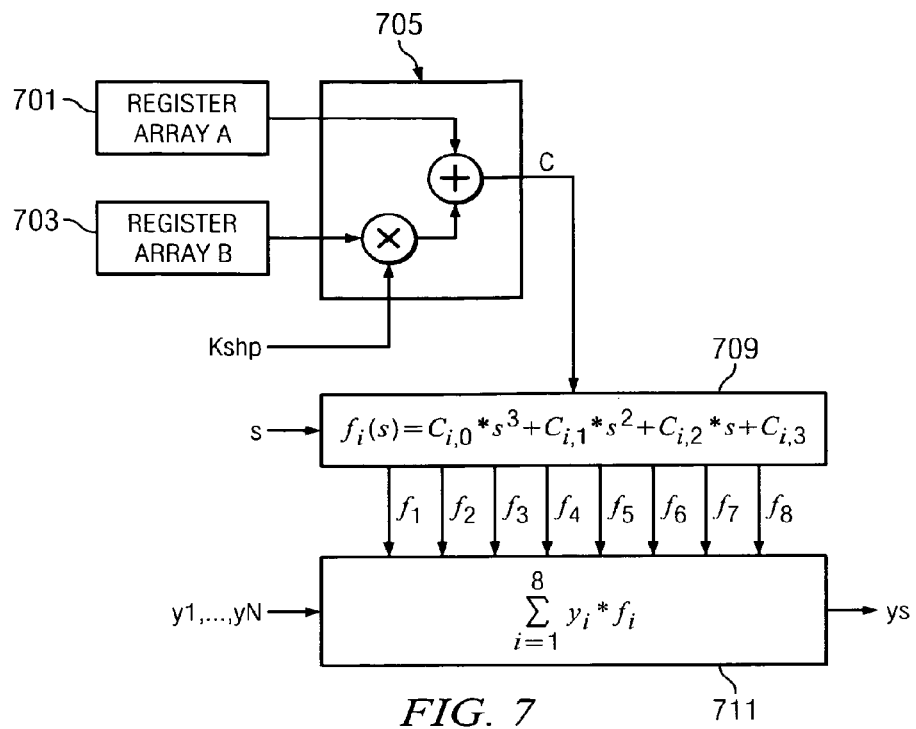
FIG. 7 illustrates an implementation of an adaptive 8-tap interpolation according to an embodiment of the present disclosure.

FIG. 7 illustrates an implementation of an adaptive 8-tap interpolation according to an embodiment of the present disclosure.

In this embodiment, coefficient A and B are stored in two register arrays 701 and 703. The coefficient C is calculated in calculation unit 705, for example, by C=A+Kshp*B. Kshp is provided by a sharpness control module 707. The coefficient C is passed to synthesis function unit 709 to generate the synthesis functions $f_i(s)$ (i=1 . . . 8). The $f_i(s)$ are then used as filter coefficients in interpolated pixel generator 711 to generate the interpolated pixel $y_s$ by an 8-tap filter.

As shown in FIG. 1, the process at de-ringing control unit 103 is used to modify the interpolated pixel adaptively to the local image feature, the local image feature being related to the local frequency characteristics. In particular embodiments, the control in the high frequency region should be less to maintain quality reconstruction in the high frequency region. In the edge or low frequency region, the control should be higher to reduce the ringing effect.

Figure 8:
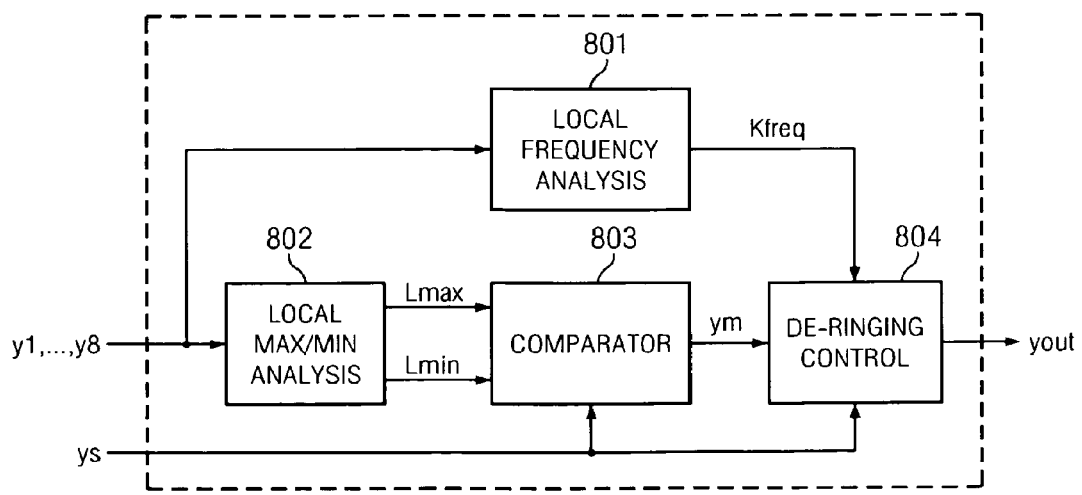
FIG. 8 illustrates an implementation of a de-ringing system according to an embodiment of the present disclosure.

FIG. 8 illustrates an implementation of a de-ringing process according to an embodiment of the present disclosure.

FIG. 8 shows a local frequency analysis unit 801, a local max/min analysis unit 802, a comparator 803 and a de-ringing control unit 804. The local frequency analysis 801 is used to calculate a feature value that is related to the local frequency. In some embodiments, the local feature is estimated, for example, using Equation 22 below:

$$Kfreq = \min(dev1, dev2, dev3, dev4)/N, \quad \text{[Eqn. 22]}$$

where dev1, dev2, dev3 and dev4 are defined as shown in Equations 23-26 below:

$$dev1 = \max(|y_1 - 2*y_2 + y_3|, |y_2 - 2*y_3 + y_4|), \quad \text{[Eqn. 23]}$$

$$dev2 = \max(|y_3 - 2*y_4 + y_5|, |y_4 - 2*y_5 + y_6|), \quad \text{[Eqn. 24]}$$

$$dev3 = \max(|y_5 - 2*y_6 + y_7|, |y_6 - 2*y_7 + y_8|), \text{ and} \quad \text{[Eqn. 25]}$$

$$dev4 = \min(|y_2 - y_4|, |y_3 - y_5|). \quad \text{[Eqn. 26]}$$

N is a constant value used to normalize Kfreq so that Kfreq is in the range of [0,1]. Of course one of ordinary skill in the art would recognize that this is just one way of determining the local feature and that other means of determining the local feature may be utilized without departing from the scope or spirit of the present disclosure.

The local max/min analysis unit 802 is used to discriminate between the larger and smaller value of the support pixels $y_4$ and $y_5$ as shown in Equations 27 and 28 below:

$$L\max = \max(y_4, y_5), \text{ and} \qquad [\text{Eqn. 27}]$$

$$L\min = \min(y_4, y_5). \qquad [\text{Eqn. 28}]$$

The outputs of the local max/min analysis unit 802 are then compared with the output of the adaptive 8-tap interpolation unit 102 ($y_s$) in the comparator 803 to generate the output ($y_m$) as shown in Equation 29 below:

$$y_m = \begin{cases} L\max & \text{if}(y_s > L\max) \\ L\min & \text{if}(y_s < L\min) \\ y_s & \text{else} \end{cases} \qquad [\text{Eqn. 29}]$$

The outputs $y_s$ and $y_m$ are then subtracted and multiplied by the local image feature Kfreq in the de-ringing control unit 804 to generate the final output $y_{out}$ as shown in Equation 30 below:

$$y_{out} = K\text{freq} * (y_s - y_m) + y_m. \qquad [\text{Eqn. 30}]$$

Figure 9:
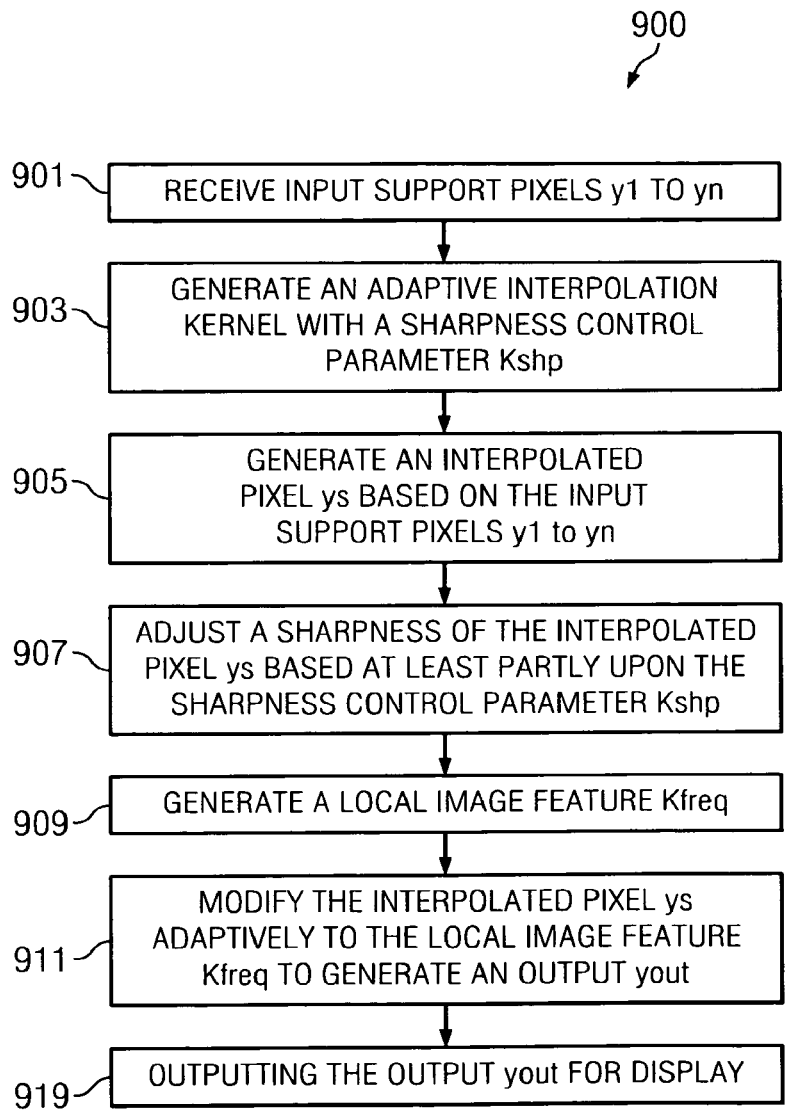
FIG. 9 illustrates a method of rescaling digital video according to an embodiment of the present disclosure.

FIG. 9 illustrates a method 900 of rescaling digital video according to an embodiment of the present disclosure.

As shown in FIG. 9, the method 900 includes receiving input support pixels $y_1$ to $y_n$ (block 901), generating a sharpness control parameter Kshp (block 903), and generating an interpolated pixel $y_s$ based on the input support pixels $y_1$ to $y_n$ (block 905). The method 900 also includes adjusting a sharpness of the interpolated pixel $y_s$ based at least partly upon the sharpness control parameter Kshp (block 907). The method 900 further includes generating a local image feature Kfreq (block 909) and modifying the interpolated pixel $y_s$ adaptively to the local image feature Kfreq to generate an output $y_{out}$ (block 911). The method 900 also includes outputting the output $y_{out}$ for display (block 913).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A digital video rescaling system comprising:
    an image data input configured to receive input support pixels $y_1$ to $y_n$;
    an interpolated pixel generator circuit configured to generate an interpolated pixel value $y_s$ from the input support pixels $y_1$ to $y_n$ based upon a sharpness control parameter Kshp;
    a de-ringing control circuit configured to modify the interpolated pixel value $y_s$ adaptively to a local image feature Kfreq to generate an output $y_{out}$;
    a local frequency analysis circuit configured to calculate the local image feature Kfreq;
    a local max/min analysis circuit configured to distinguish between a larger and a smaller value of two support pixels $y_a$ and $y_b$ and generate outputs Lmax and Lmin; and
    a comparator circuit configured to compare the interpolated pixel value $y_s$ with the output Lmax and Lmin and generate a comparison result $y_m$.

2. The digital video rescaling system in accordance with claim 1 wherein the local image feature Kfreq is related to local frequency characteristics.

3. The digital video rescaling system in accordance with claim 1 wherein the comparator circuit is configured to generate the comparison result $y_m$ as follows:

$$y_m = \begin{cases} L\max & \text{if}(y_s > L\max) \\ L\min & \text{if}(y_s < L\min) \\ y_s & \text{else} \end{cases}.$$

4. The digital video rescaling system in accordance with claim 1 wherein the de-ringing control circuit is further configured to:
    subtract the comparison result $y_m$ from the interpolated pixel value $y_s$;
    multiply a difference by the local image feature Kfreq; and
    add a product to comparison result to generate $y_{out}$.

5. The digital video rescaling system in accordance with claim 1 wherein the local frequency analysis circuit is configured to calculate the local image feature Kfreq as follows:

$K\text{freq} = \min(\text{dev1}, \text{dev2}, \text{dev3}, \text{dev4})/N$, where dev1, dev2, dev3 and dev4 are defined as:

$\text{dev1} = \max(|y_1 - 2*y_2 + y_3|, |y_2 - 2*y_3 + y_4|)$, $\text{dev2} = \max(|y_3 - 2*y_4 + y_5|, |y_4 - 2*y_5 + y_6|)$, $\text{dev3} = \max(|y_5 - 2*y_6 + y_7|, |y_6 - 2*y_7 + y_8|)$, and $\text{dev4} = \max(|y_2 - y_4|, |y_3 - y_5|)$, and where N is a constant value used to normalize Kfreq so that Kfreq is in the range of [0, 1].

6. The digital video rescaling system in accordance with claim 1 wherein the interpolated pixel generator circuit is configured to generate a first coefficient matrix C(i,j) based on a second coefficient matrix A(i,j), a third coefficient matrix B(i,j) and the sharpness control parameter Kshp; and wherein the interpolated pixel generator circuit is configured to generate the interpolated pixel value $y_s$ using the first coefficient matrix C(i,j).

7. The digital video rescaling system in accordance with claim 1 wherein the interpolated pixel generator circuit is configured to generate the interpolated pixel value $y_s$ using third order polynomial functions based at least partly upon eight input support pixels $y_1$ to $y_8$.

8. The digital video rescaling system in accordance with claim 1 wherein the interpolated pixel value $y_s$ is generated based upon:

$$y_s(s) = \sum_{n=1}^{8} y_n * f_n(s, K shp),$$

where $y_n$, n=(1, . . . , 8) are eight support pixels, S is a phase of an interpolation which is a distance from an interpolation position to a position of support pixel $y_4$, the preselected support pixel, $f_n(s, K shp)$, n=(1, . . . , 8) are eight control synthesis functions that can be expressed as:

$$f_1(s, Kshp) = \\ (a(0,0) + Kshp*b(0,0))*s^3 + (a(0,1) + Kshp*b(0,1))*s^2 + \\ (a(0,2) + Kshp*b(0,2))*s + (a(0,3) + Kshp*b(0,3)),$$

$$f_2(s, Kshp) = \\ (a(1,0) + Kshp*b(1,0))*s^3 + (a(1,1) + Kshp*b(1,1))*s^2 + \\ (a(1,2) + Kshp*b(1,2))*s + (a(1,3) + Kshp*b(1,3)),$$

$$f_3(s, Kshp) = \\ (a(2,0) + Kshp*b(2,0))*s^3 + (a(2,1) + Kshp*b(2,1))*s^2 + \\ (a(2,2) + Kshp*b(2,2))*s + (a(2,3) + Kshp*b(2,3)),$$

$$f_4(s, Kshp) = \\ (a(3,0) + Kshp*b(3,0))*s^3 + (a(3,1) + Kshp*b(3,1))*s^2 + \\ (a(3,2) + Kshp*b(3,2))*s + (a(3,3) + Kshp*b(3,3)),$$

$$f_5(s, Kshp) = f_4((1-s), Kshp),$$
$$f_6(s, Kshp) = f_3((1-s), Kshp),$$
$$f_7(s, Kshp) = f_2((1-s), Kshp),$$
$$f_8(s, Kshp) = f_1((1-s), Kshp),$$

and $$A = \begin{bmatrix} a(0,0) & a(0,1) & a(0,2) & a(0,3) \\ a(1,0) & a(1,1) & a(1,2) & a(1,3) \\ a(2,0) & a(2,1) & a(2,2) & a(2,3) \\ a(3,0) & a(3,1) & a(3,2) & a(3,3) \end{bmatrix}$$

and $$B = \begin{bmatrix} b(0,0) & b(0,1) & b(0,2) & b(0,3) \\ b(1,0) & b(1,1) & b(1,2) & b(1,3) \\ b(2,0) & b(2,1) & b(2,2) & b(2,3) \\ b(3,0) & b(3,1) & b(3,2) & b(3,3) \end{bmatrix}$$

are two coefficient matrices.

9. The digital video rescaling system in accordance with claim 8 wherein the coefficient matrices A and B are:

$$A = \begin{bmatrix} -21 & 52 & -32 & 0 \\ 52 & -150 & 97 & 1 \\ -154 & 412 & -256 & 0 \\ 304 & -587 & 28 & 254 \end{bmatrix}$$

and $$B = \begin{bmatrix} -9 & 21 & -11 & -2 \\ 15 & -38 & 18 & 3 \\ -32 & 69 & -23 & -11 \\ 51 & -88 & 5 & 21 \end{bmatrix}.$$

10. A digital video rescaling system comprising:
an image data input configured to receive input support pixels;
an interpolated pixel generator circuit configured to generate an interpolated pixel value from the input support pixels based upon a sharpness control parameter; and
a de-ringing control circuit configured to modify the interpolated pixel value to a local image feature;
a local frequency analysis circuit configured to calculate the local image feature;
a local max/min analysis circuit configured to distinguish between a larger and a smaller value of two support pixels and generate outputs; and
a comparator circuit configured to compare the interpolated pixel value with the outputs and generate a comparison result.

11. The digital video rescaling system in accordance with claim 10 wherein the de-ringing control circuit is configured to modify the interpolated pixel value based upon a local image feature.

12. The digital video rescaling system in accordance with claim 10 wherein the interpolated pixel generator circuit is configured to generate a first coefficient matrix based on a second coefficient matrix, a third coefficient matrix and the sharpness control parameter; and wherein the interpolated pixel generator circuit is configured to generate the interpolated pixel value using the first coefficient matrix.

13. The digital video rescaling system in accordance with claim 10 wherein the interpolated pixel generator circuit is configured to generate the interpolated pixel value using third order polynomial functions.

14. The digital video rescaling system in accordance with claim 10 wherein the interpolated pixel generator circuit is configured to generate the interpolated pixel value based at least partly upon eight input support pixels.

15. A digital video rescaling method comprising:
receiving input support pixels from an image data input;
generating an interpolated pixel value from the input support pixels based upon a sharpness control parameter using an interpolated pixel generator circuit coupled to the image data input; and
modifying the interpolated pixel value to a local image feature using a de-ringing control circuit coupled to the interpolated pixel generator;
calculating the local image feature using a local frequency analysis circuit;
distinguishing between a larger and a smaller value of two support pixels and generating outputs using a local max/min analysis circuit; and
comparing the interpolated pixel value with the outputs and generating a comparison result using a comparator circuit.

16. The digital video rescaling method in accordance with claim 15 wherein the de-ringing control circuit modifies the interpolated pixel value based upon a local image feature.

17. The digital video rescaling method in accordance with claim 15 wherein the interpolated pixel generator circuit generates a first coefficient matrix based on a second coefficient matrix, a third coefficient matrix and the sharpness control parameter; and wherein the interpolated pixel generator circuit generates the interpolated pixel value using the first coefficient matrix.

18. The digital video rescaling method in accordance with claim 15 wherein the interpolated pixel generator circuit generates the interpolated pixel value using third order polynomial functions.

19. The digital video rescaling method in accordance with claim 15 wherein the interpolated pixel generator circuit generates the interpolated pixel value based at least partly upon eight input support pixels.

\* \* \* \* \*

UNITED STATES PATENT AND TRADEMARK OFFICE
CERTIFICATE OF CORRECTION

PATENT NO. : 9,390,469 B2  
APPLICATION NO. : 14/466274  
DATED : July 12, 2016  
INVENTOR(S) : Yong Huang Page 1 of 1

It is certified that error appears in the above-identified patent and that said Letters Patent is hereby corrected as shown below:

In the claims:

Column 9, Lines 1-15, Claim 8

Delete: "$f_1(s,Kshp)=(a(0,0)+Kshp*b(0,0))* s^3+(a(0,1)+Kshp*b(0,1))*s^2 +(a(0,2)+Kshp*b(0,2)*s+(a(0,3)+Kshp*b(0,3))$,
$f_2(s,Kshp)=(a(1,0)+Kshp*b(1,0))* s^3 +(a(1,1)+Kshp*b(1,1))*s^2+(a(1,2)+Kshp*b(1,2)*s+(a(1,3)+Kshp*b(1,3))$,
$f_3(s,Kshp)=(a(2,0)+Kshp*b(2,0))* s^3+(a(2,1)+Kshp* b(2,1))*s^2+(a(2,2)+Kshp*b(2,2)*s+(a(2,3)+Kshp*b(2,3))$,
$f_4(s,Kshp)=(a(3,0)+Kshp*b(3,0))* s^3+(a(3,1)+Kshp *b(3,1))* s^2+(a(3,2)+Kshp*b(3,2)*s+(a(3,3)+Kshp*b(3,3))$,"

Insert: -- $f_1(s,Kshp)=(a(0,0)+Kshp*b(0,0))* s^3+(a(0,1)+Kshp*b(0,1))*s^2 +(a(0,2)+Kshp*b(0,2))*s+(a(0,3)+Kshp*b(0,3))$,
$f_2(s,Kshp)=(a(1,0)+Kshp*b(1,0))* s^3 +(a(1,1)+Kshp*b(1,1))*s^2+(a(1,2)+Kshp*b(1,2))*s+(a(1,3)+Kshp*b(1,3))$,
$f_3(s,Kshp)=(a(2,0)+Kshp*b(2,0))* s^3+(a(2,1)+Kshp* b(2,1))*s^2+(a(2,2)+Kshp*b(2,2))*s+(a(2,3)+Kshp*b(2,3))$,
$f_4(s,Kshp)=(a(3,0)+Kshp*b(3,0))* s^3+(a(3,1)+Kshp *b(3,1))* s^2+(a(3,2)+Kshp*b(3,2))*s+(a(3,3)+Kshp*b(3,3))$, --

Signed and Sealed this  
Thirtieth Day of August, 2016

Michelle K. Lee  
*Director of the United States Patent and Trademark Office*